United States Patent [19]

Raftis et al.

[11] Patent Number: 4,585,031
[45] Date of Patent: Apr. 29, 1986

[54] INVERSION-RESISTANT TIDE GATE VALVE

[75] Inventors: Spiros G. Raftis, Pittsburgh, Pa.; George W. Merritt, Akron, Ohio

[73] Assignee: Red Valve Co., Inc., Carnegie, Pa.

[21] Appl. No.: 754,819

[22] Filed: Jul. 12, 1985

[51] Int. Cl.⁴ ............................................. F16K 15/16
[52] U.S. Cl. .................................... 137/846; 137/847; 137/850
[58] Field of Search ............... 137/846, 847, 848, 849, 137/850

[56] References Cited

U.S. PATENT DOCUMENTS

| 171,817 | 1/1876 | Kahl | 137/847 |
| 2,647,728 | 8/1953 | Smith | 137/846 X |
| 3,983,900 | 10/1976 | Airhart | 137/855 |
| 4,492,253 | 1/1985 | Raftis . | |

FOREIGN PATENT DOCUMENTS 1600743 10/1981 United Kingdom ............... 137/850

Primary Examiner—Robert G. Nilson
Attorney, Agent, or Firm—Kirschstein, Kirschstein, Ottinger & Israel

[57] ABSTRACT

An inversion-resistant tide gate valve includes a multiple-ply sleeve, and a rigid support member embedded therein to prevent the sleeve from sagging and to impart strength to the sleeve to prevent inversion.

7 Claims, 5 Drawing Figures

INVERSION-RESISTANT TIDE GATE VALVE

BACKGROUND OF THE INVENTION

1. Field of the Invention

This invention generally relates to a tide gate valve and, more particularly, to such valves for use on large-sized storm sewer pipes having diameters on the order of 54 inches.

2. Description of the Prior Art

A check valve is essentially a valve which allows fluid flow in only one direction through a conduit, while closing and preventing back or reverse flow, when back pressure builds up downstream of the valve to a level greater than the initial fluid pressure head. One variety of check valve which has been developed in recent years entails a flexible, resilient sleeve which terminates with a symmetrically tapered duck-bill configuration and a rectilinear outlet end which opens to an oval or circular shape to accommodate successively greater fluid flow, but which closes on back pressure build-up. One problem with such valves, especially in larger sizes, is that when a high back pressure is induced, the duck-bill sleeve collapses and inverts, thus permitting back flow of fluid.

The fluid back-flow problem is especially acute when such valves are used to handle storm sewer effluent. Virtually all municipalities near waterways have storm sewer pipes which empty into the waterways. When the tide is in, these sewer pipes back-fill with the water from the waterway. This leaves no or reduced storage capacity in the sewer pipes. In the event there is a large cloudburst or storm during the time that the tide is in, all or a portion of the storm water cannot get into the sewer because the sewer pipes are at least partially filled. This causes street flooding.

To deal with the street flooding problem, various types of tide gate valves have been proposed. One type consists of a wooden gate which floats up when the tide comes in, thereby closing the tide gate valve to prevent the sewer pipe from filling with the tide water. When the tide goes out, the wooden gate sinks, thereby opening the tide gate valve. Another type consists of a mechanical tide gate valve made of steel which, however, is subject to corrosion from salt water. Such previously proposed tide gate valves are also subject to jamming when trees, logs, bricks and the like get into the valves and prevent the gates from fully closing.

For large-sized sewer pipes on the order of 36 inches, 54 inches, 72 inches or even greater diameter, a design problem is inversion, because the larger the diameter of the valve, the larger the area of the valve and, in such cases, even a low back pressure multiplied times a large valve area will invert and collapse the flexible sleeve of the valve, thus allowing reverse flow of fluid to take place.

An improved tide gate check valve suitable for large-sized conduits such as storm sewer pipes was disclosed in U.S. Pat. No. 4,492,253 which, although generally satisfactory for its intended purpose, was not altogether reliable in use in certain applications. Thus, in applications where the tide gate valve has lips located near the base of an underground vault, it is desirable that the lower lip closest to the base move toward the same to a lesser extent than the upper lip is caused to move away from the base. Also, sewage flowing through the valve causes the lower wall of the sleeve, as well as the lower lip, to sag. The larger the valve, the greater the tendency for the sleeve to sag and, hence, the more likely that the tide gate valve will not properly operate.

SUMMARY OF THE INVENTION

1. Objects of the Invention

It is a general object of this invention to provide a reliable, improved tide gate valve for large-sized conduits which is resistant to inversion and sagging in use.

It is another object of this invention to provide a self-supporting tide gate valve for large-sized conduits.

It is a further object of this invention to provide such a tide gate valve which is wear-resistant to raw, unscreened sewage and like fluids.

It is still another object of this invention to provide such a tide gate valve which opens and closes in response to a predetermined minimum pressure differential between the interior and exterior of the sleeve, and which nevertheless is highly resistant to inversion.

It is yet another object of this invention to provide such a tide gate valve having lips which are offset relative to an axis of symmetry of a conduit on which the valve is mounted, one of the lips being movable to a greater extent than the other of the lips.

2. Features of the Invention

In keeping with these objects and others which will become apparent hereinafter, one feature of this invention resides, briefly stated, in an inversion-resistant tide gate valve for sewage conduits, particularly for large-sized storm sewer pipes, which comprises a sleeve bounding a longitudinally-extending flow-through passage for sewage fluids. The sleeve has an upstream fluid inlet end region mountable on a discharge end of a sewage conduit which is elongated along a longitudinal axis of symmetry. The sleeve also has a downstream fluid outlet end region comprised of an upper and a lower lip which are opposed to each other, and which are located in an offset position off to one side of the symmetry axis, and preferably below the same. The lips are movable from a closed condition in which the lips sealingly engage each other, to an open condition in which the lips are located away from each other in response to a pressure head exerted in a direction downstream of the passage.

The sleeve further has a tapered intermediate region located between the inlet and the outlet regions. The tapered region has an upper and a lower body wall which converge toward each other. The upper and lower body walls merge with and are jointly movable with the upper and lower lips. The upper wall and upper lip are movable in a generally radial direction through a distance which is larger than the distance through which the lower wall and lower lip are movable.

The sleeve is constituted of multiple plies, each extending along the length of the inlet, tapered and outlet regions of the sleeve. The plies include an inner, wear-resistant ply bounding the passage and exposed to sewage fluids passing therethrough. At least one support ply surrounds the wear-resistant ply for imparting support to the sleeve to maintain the lips in the offset position and to prevent the lips from sagging from the offset position. In addition, the support ply imparts strength to the sleeve to prevent the lips from inverting in response to a back pressure exerted in a direction upstream of the passage. At least one reinforcing ply surrounds the wear-resistant ply for reinforcing the sleeve and preventing the pressure head within the passage from outwardly deforming the sleeve. An outer protective ply surrounds all of the aforementioned plies for protecting the same.

In further accordance with this invention, a support member, preferably an angle iron, is embedded in the lower body wall of the sleeve, and preferably between the wear-resistant and the support plies. The angle iron extends along the length of the inlet and tapered regions of the sleeve, and assists the support ply in maintaining the lips in the offset position, in preventing the lips from sagging from the offset position, and in imparting additional strength to the sleeve to prevent the lips from inverting.

In a preferred embodiment of this invention, the wear-resistant ply is constituted of rubber, and has a durometer of between 30 and 40. Also, there are two support plies, and each is constituted of rubber, having a durometer of about 90. In addition, there are three reinforcing plies, each constituted of nylon. Finally, the protective ply is constituted of rubber, and has a durometer of between 35 and 40. The relatively low durometer of the wear-resistant ply renders the same soft so that the wear-resistant ply readily snugly conforms to the outer periphery of any object entrained in the sewage fluids. The relatively high durometer of each support ply renders the same strong enough to support the lips in the offset position and to resist inversion, as well as to resist sagging of the sleeve.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
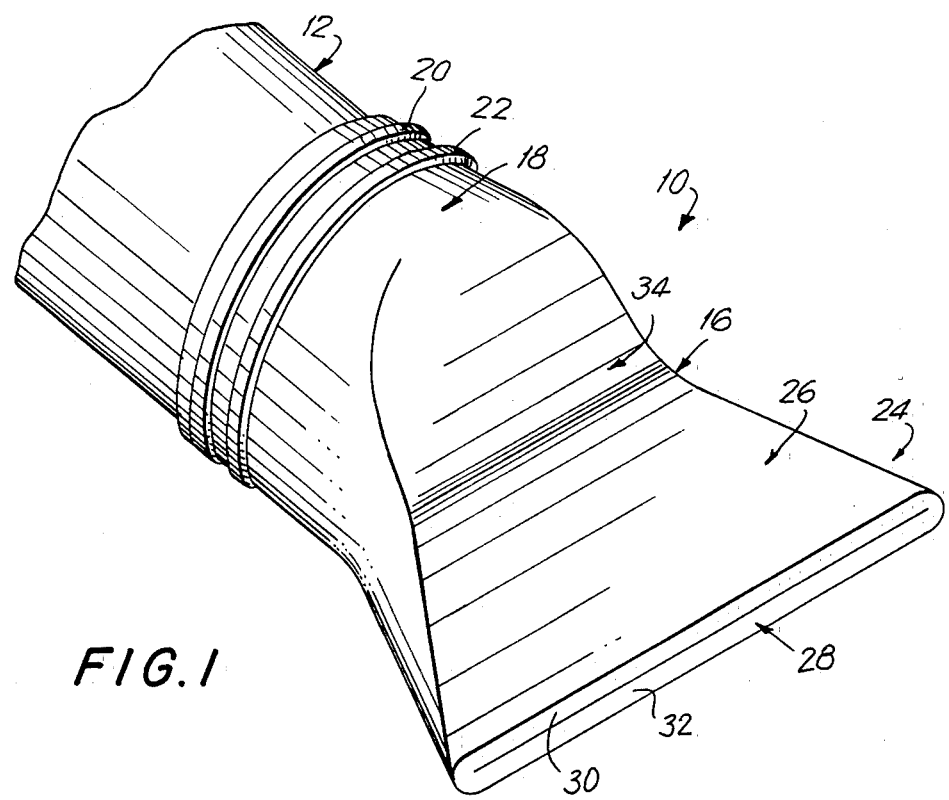
FIG. 1 is a front perspective view of a tide gate valve in accordance with this invention, mounted at a discharge end of a partially broken-away conduit.
Figure 2:
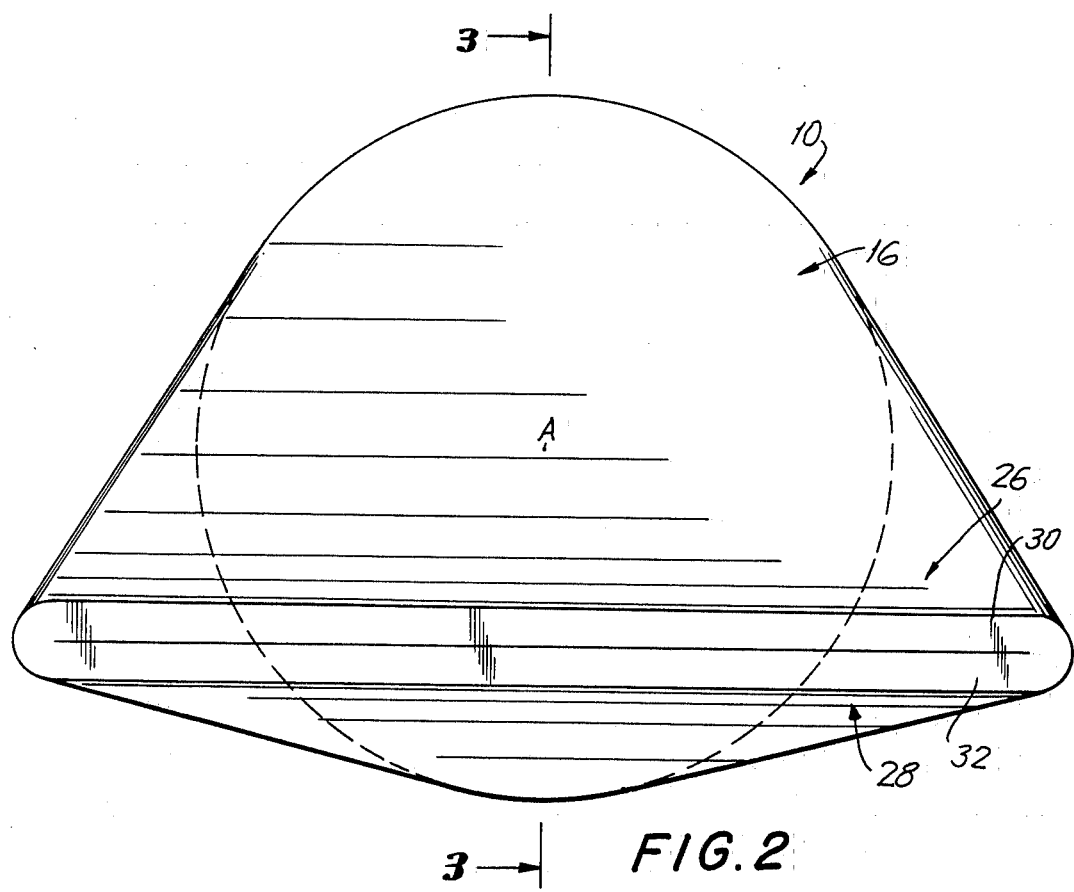
FIG. 2 is a front view of the valve of FIG. 1.

Referring now to the drawings, reference numeral 10 generally identifies a tide gate valve mounted at a discharge end of a conduit 12 from which fluids are discharged. The conduit 12 may be a storm sewer pipe, an industrial waste pipe, or any pipe which discharges an effluent into a river, creek, ocean or analogous waterway.

Figure 3:
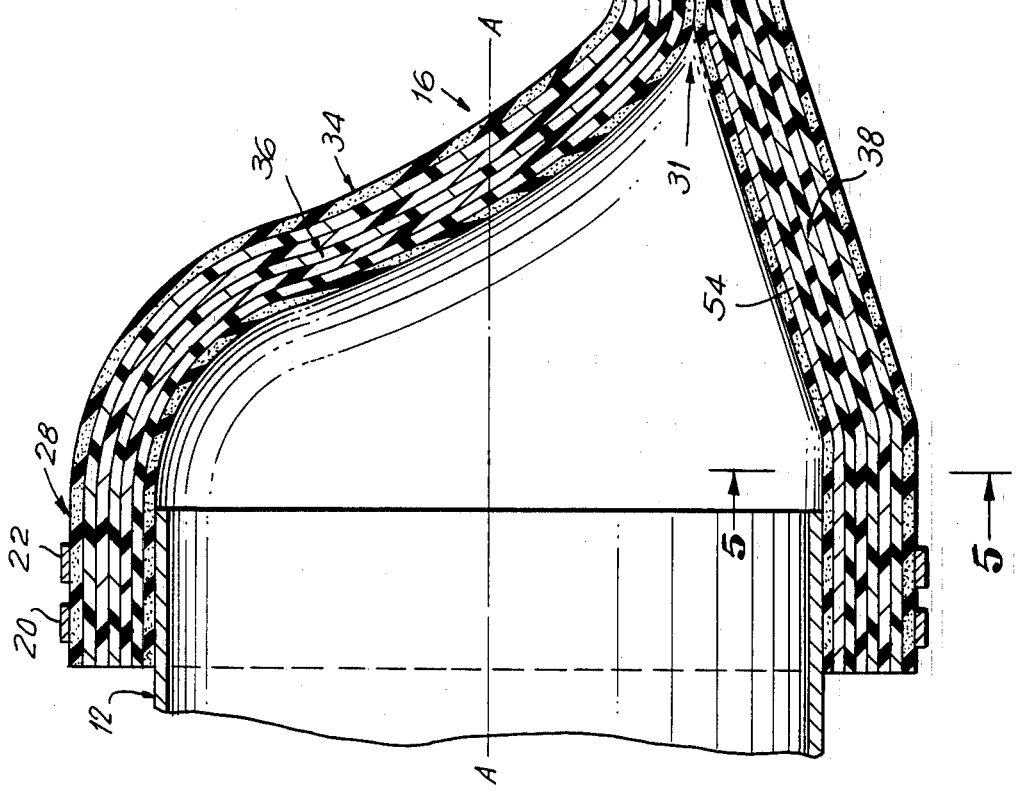
FIG. 3 is a sectional view taken along line 3—3 of FIG. 2.

The valve 10 includes a flexible, resilient sleeve 16 which bounds a longitudinally-extending, flow-through passage for the effluent sewage fluids which may be a liquid or slurry such as raw sewage, storm rain water, lime, sludge, chemical slurry, scum paper stock, tailings slurry, or any industrial waste. As best shown in FIG. 3, the sleeve 16 has a generally cylindrical, upstream fluid inlet end region 18 mounted on and around the discharge end of the conduit 12. A pair of hold-down straps 20, 22 lockingly encircle the upstream region 18 and fix the position of the same. The conduit 12 is elongated along a longitudinal axis of symmetry A—A about which the upstream region 18 extends.

The sleeve 16 also has a downstream fluid outlet end region 24 which is comprised of an upper lip 26 and a lower lip 28. The lips are flattened, and have broad, planar mating surfaces facing and opposed to each other. The lips extend over a predetermined length in mutual contact with each other from a so-called boot region 31 of the sleeve all the way to a pair of end faces 30, 32 at the extreme outer ends of the lips 26, 28. The lips are located in an offset position off to one side of the axis A—A and, in a preferred construction, below the axis A—A. The lips are normally in the illustrated closed position in which the lips sealingly engage each other.

In response to a pressure head exerted in the downstream direction of the passage such that the pressure inside the passage, due to the fluid flow therethrough, is greater than the pressure outside the passage, the lips are movable apart from each other in a transverse direction generally perpendicular to their mating surfaces, to an open position in which the fluid within the passage may flow past the opened lips to the exterior of the sleeve. When the fluid flow ceases, or when a back pressure is exerted in the upstream direction of the passage such that the back pressure is greater by a predetermined amount than the internal pressure, then the lips move toward each other and return to the closed position. In the event that the back pressure is considerably higher than the internal pressure as a result, for example, as when the tide is in, then the valve is designed, as explained below, to resist such back pressure forces from inverting the lips and redirecting them to extend upstream into the passage.

The sleeve 16 also has a tapered intermediate region 34 located between the inlet region 18 and the outlet region 24. The tapered region 34 has an upper body wall 36 which merges and is jointly movable with the upper lip 26, and a lower body wall 38 which merges and is jointly movable with the lower lip 28. As best shown in FIG. 3, the upper wall 36 initially converges downwardly toward the axis A—A at a steep slope, and thereupon reverses its curvature before merging with the upper lip which lies in a horizontal plane generally parallel to and below the axis. In a preferred embodiment wherein the inlet region 18 fits around a conduit having an internal diameter on the order of 54 inches, the steep slope is about 14°, and the radius of curvature is about 2⅔ feet. As for the lower wall 38, it converges upwardly at a more gradual, constant slope until it merges with the lower lip 28 which lies in a horizontal plane generally parallel to and below the axis. In the preferred embodiment, the more gradual slope is less than 45° to prevent inversion. In use, the upper wall 36 and the upper lip 26 travel upwardly to a greater extent than the lower wall 38 and the lower lip 28 travel downwardly.

Figure 4:
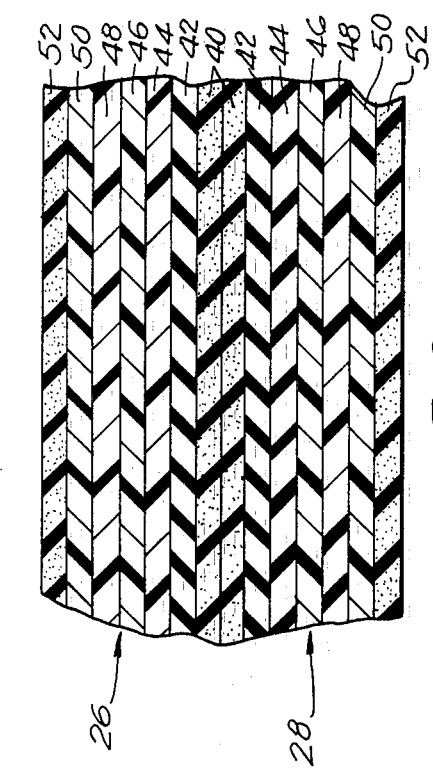
FIG. 4 is a sectional view taken along line 4—4 of FIG. 3.

The sleeve 16 is constituted of a plurality of plies, each of which extends along the length of the inlet 18, tapered 34 and outlet 24 regions of the sleeve. As best shown in FIG. 4, an inner wear-resistant ply 40 of resilient sealing material bounds the passage and is exposed to sewage fluids passing therethrough. At least one, and preferably a pair of, support plies 42, 44 surround the wear-resistant ply 40. The support plies are operative for imparting support to the sleeve 16 to maintain the lips 26, 28 in the offset position, and to prevent the lips from sagging from the offset position. In addition, the support plies 42, 44 are operative for imparting strength to the sleeve to prevent the lips from inverting in response to a back pressure exerted in a direction upstream of the passage.

At least one, and preferably three, reinforcing plies 46, 48, 50 each surround the support plies 42, 44. The reinforcing plies are operative for reinforcing the sleeve 16 and preventing the pressure head within the passage from outwardly deforming the sleeve. In effect, the sleeve is prevented from being permanently deformed and bulging outwardly in response to very large pressure heads within the passage. An outer protective ply 52 surrounds all of the aforementioned plies for protecting the same, for example, from the deleterious effects of the environment, for instance, ozone.

In a preferred construction, the wear-resistant ply 40 is constructed of rubber having a durometer of 30, and has a thickness of about ⅜ inch. Each support ply is also constructed of rubber, having a higher durometer of about 90 for strength purposes, and has a thickness of about ⅛ inch. Each reinforcing ply preferably is constituted of a neoprene-rubbercoated nylon having a thickness of about 0.042 inch. The protective ply preferably is constituted of ethylpropylenediene monomer (EPDM) rubber having a durometer of about 35 to about 40, and having a thickness of about ⅛ inch.

Figure 5:
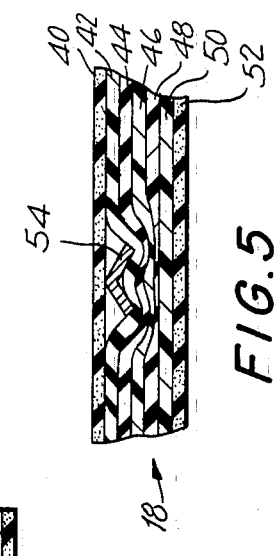
FIG. 5 is a sectional view taken along line 5—5 of FIG. 3.

In further accordance with this invention, a support member 54 is embedded in the sleeve, and extends along the length of the inlet 18 and tapered 34 regions. The support member does not extend along the length of the outlet region 24. The support member 54 assists the support plies 42, 44 in maintaining the lips 26, 28 in the offset position, and in preventing the lips from sagging therefrom. The support member 54 also imparts additional strength to the sleeve to prevent the lips from inverting. As best shown in FIG. 5, the support member is an angle iron, preferably located between the wear-resistant ply 40 and the support ply 42.

The sleeve of this invention can be employed on conduits having inside diameters ranging from about ¼ inch to about 54 inches. In order to further prevent the lips from inverting, the lips are made long. For a sleeve mounted on a ¼ inch diameter pipe, the length of the lips is approximately 1 inch, and increases in length to about 18 inches for pipes having an inside diameter of about 54 inches.

The aforementioned sleeve 16 is designed so that the lips 26, 28 open in response to a pressure differential on the order of 2 psi between the interior and the exterior of the passage when no water from the waterway is located exteriorly of the passage. At high tide, the valve 10 is positioned such that the lips 26, 28 are located approximately 4 feet below the level of the water. The valve is then designed to open up in the presence of such water when the exterior water level falls by about 2½ inches.

The tide gate valve of this invention provides numerous advantages over the art. The flexible sleeve does not collapse or invert even when high back pressure builds up and, consequently, this valve is eminently suited for large-sized installations in ducts or conduits having diameters on the order of 54 inches. The sleeve is a full-bore element which provides a non-clogging, streamlined flow and quiet operation in service. The sleeve is free-opening and non-slam-closing, and can be installed in any position, and preferably adjacent a base wall in an underground vault. The sleeve opens to full 100% bore area of the pipe, and will pass a solid equal to the flow diameter size of the pipe, and can replace tide gates in current use. The sleeve is substantially rigid on back pressure, and does not invert but merely closes to prevent reverse or back flow of fluid into the pipe. At the same time, the sleeve is readily openable and flexible on forward pressure to permit the ready discharge of sewage fluids.

It will be understood that each of the elements described above, or two or more together, also may find a useful application in other types of constructions differing from the types described above.

While the invention has been illustrated and described as embodied in an inversion-resistant tide gate valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An inversion-resistant tide gate valve for sewage conduits, particularly for large-sized storm sewer pipes, comprising:
    (a) a sleeve bounding a longitudinally-extending, flow-through passage for sewage fluids,
    (b) said sleeve having an upstream fluid inlet end region mountable on a discharge end of a sewage conduit which is elongated along a longitudinal axis of symmetry,
    (c) said sleeve having a downstream fluid outlet end region which has an upper and a lower lip opposed to each other and located in an offset position to one side of the symmetry axis, said lips being movable from a closed to an open condition in which the lips respectively sealingly engage, and are located away from, each other in response to a pressure head exerted in a direction downstream of the passage,
    (d) said sleeve having a tapered intermediate region located between the inlet and the outlet regions having an upper and a lower body wall which respectively merge and are respectively movable with the upper and the lower lips, said upper body wall and upper lip being movable in a radial direction through a predetermined distance which is larger than the distance through which the lower body wall and the lower lip are movable,
    (e) said sleeve being constituted of multiple plies, each extending along the length of the inlet, tapered and outlet regions of the sleeve, said plies including
        (i) an inner wear-resistant ply of resilient sealing material bounding the passage and exposed to sewage fluids passing therethrough,
        (ii) at least one support ply surrounding the wear-resistant ply, for imparting support to the sleeve to maintain the lips in the offset position and to prevent the lips from sagging from the offset position, and for imparting strength to the sleeve to prevent the lips from inverting in response to a back pressure exerted in a direction upstream of the passage, (iii) at least one reinforcing ply surrounding the wear-resistant ply, for reinforcing the sleeve and preventing the pressure head within the passage from outwardly deforming the sleeve, and (iv) an outer protective ply surrounding the wear-resistant, support and reinforcing plies for protecting the same.

2. The valve as recited in claim 1, wherein said upper body wall is tapered to a greater extent than said lower body wall.

3. The valve as recited in claim 1; and further comprising a support member embedded in the sleeve and extending along the length of the inlet and tapered regions of the sleeve, for assisting the support ply in maintaining the lips in the offset position and in preventing the lips from sagging from the offset position, and for imparting additional strength to the sleeve to prevent the lips from inverting.

4. The valve as recited in claim 3, wherein said support member is an angle iron located between the wear-resistant and the support ply.

5. The valve as recited in claim 1, wherein said wear-resistant ply is constituted of rubber having a durometer of between 30 and 40; and wherein said support ply is constituted of rubber having a durometer of about 90; and wherein said reinforcing ply is constituted of nylon; and wherein said protective ply is constituted of rubber having a durometer of between 35 and 40.

6. The valve as recited in claim 1, wherein the upstream fluid inlet end region has a circular cross-section having a maximum inside diameter on the order of 54 inches.

7. An inversion-resistant tide gate valve for sewage conduits, particularly for large-sized storm sewer pipes having diameters on the order of 54 inches, comprising:

(a) a sleeve bounding a longitudinally-extending, flow-through passage for sewage fluids, (b) said sleeve having an upstream fluid inlet end region mountable on a discharge end of a sewage conduit which is elongated along a longitudinal axis of symmetry, (c) said sleeve having a downstream fluid outlet end region which has an upper and a lower lip opposed to each other and located in an offset position to one side of the symmetry axis, said lips being movable from a closed to an open condition in which the lips respectively sealingly engage, and are located away from each other in response to a pressure head exerted in a direction downstream of the passage, (d) said sleeve having a tapered intermediate region located between the inlet and the outlet regions and having an upper and a lower body wall which respectively merge and are respectively movable with the upper and the lower lips, said upper body wall and upper lip being movable in a radial direction through a predetermined distance which is larger than the distance through which the lower body wall and the lower lip are movable, (e) said sleeve being constituted of multiple plies, each extending along the length of the inlet, tapered and outlet regions of the sleeve, said plies including (i) an inner wear-resistant ply of resilient sealing material bounding the passage and exposed to sewage fluids passing therethrough, (ii) a pair of support plies, each surrounding the wear-resistant ply, for imparting support to the sleeve to maintain the lips in the offset position and to prevent the lips from sagging from the offset position, and for imparting strength to the sleeve to prevent the lips from inverting in response to a back pressure exerted in a direction upstream of the passage, (iii) a pair of reinforcing plies, each surrounding the support plies, for reinforcing the sleeve and preventing the pressure head within the passage from outwardly deforming the sleeve, (iv) an outer protective ply surrounding the wear-resistant support and reinforcing plies for protecting the same, and (f) a support member embedded in the lower body wall of the sleeve and extending along the length of the inlet and tapered regions of the sleeve, for assisting the support plies in maintaining the lips in the offset position and in preventing the lips from sagging from the offset position, and for imparting additional strength to the sleeve to prevent the lips from inverting.

* * * * *